United States Patent [19]
Britton et al.

[11] 4,175,928
[45] Nov. 27, 1979

[54] HYDRODESULFURIZATION PURIFICATION PROCESS FOR COAL GASIFICATION

[75] Inventors: Michael W. Britton; Eugene A. Harlacher; John N. Dew, all of Ponca City, Okla.; Joseph A. Kleinpeter, McMurray, Pa.

[73] Assignee: Conoco Methanation Company, Stamford, Conn.

[21] Appl. No.: 928,339

[22] Filed: Jul. 27, 1978

Related U.S. Application Data

[63] Continuation-in-part of Ser. No. 808,425, Jun. 20, 1977, abandoned, which is a continuation-in-part of Ser. No. 725,761, Sep. 23, 1976, abandoned, which is a continuation-in-part of Ser. No. 637,919, Dec. 5, 1975, abandoned.

[51] Int. Cl.² .............................................. C10K 1/20
[52] U.S. Cl. ................................. 48/197 R; 48/202; 423/230; 423/244; 423/564
[58] Field of Search ................... 48/197 R, 202, 210, 48/215; 423/244, 245, 230, 564, 573, 574

[56] References Cited

U.S. PATENT DOCUMENTS

| | | | |
|---|---|---|---|
| 3,752,877 | 8/1973 | Beavon | 423/564 |
| 3,848,071 | 11/1974 | Groenendaal | 423/564 |
| 3,977,843 | 8/1976 | Dew et al. | 48/197 R |
| 4,026,679 | 5/1977 | Collin | 48/197 R |

FOREIGN PATENT DOCUMENTS 809584  4/1969  Canada .............................. 423/244 R

*Primary Examiner*—S. Leon Bashore
*Assistant Examiner*—George C. Yeung
*Attorney, Agent, or Firm*—W. A. Mikesell, Jr.; F. L. Scott

[57] ABSTRACT

A method is provided wherein nickel molybdenum and cobalt molybdenum catalysts can be used in large scale sulfur hydrogenation reactors without runaway methanation and resulting exotherms while converting organic sulfur compounds to hydrogen sulfide in gas streams which contain significant quantities of carbon monoxide, carbon dioxide, and hydrogen.

6 Claims, 1 Drawing Figure

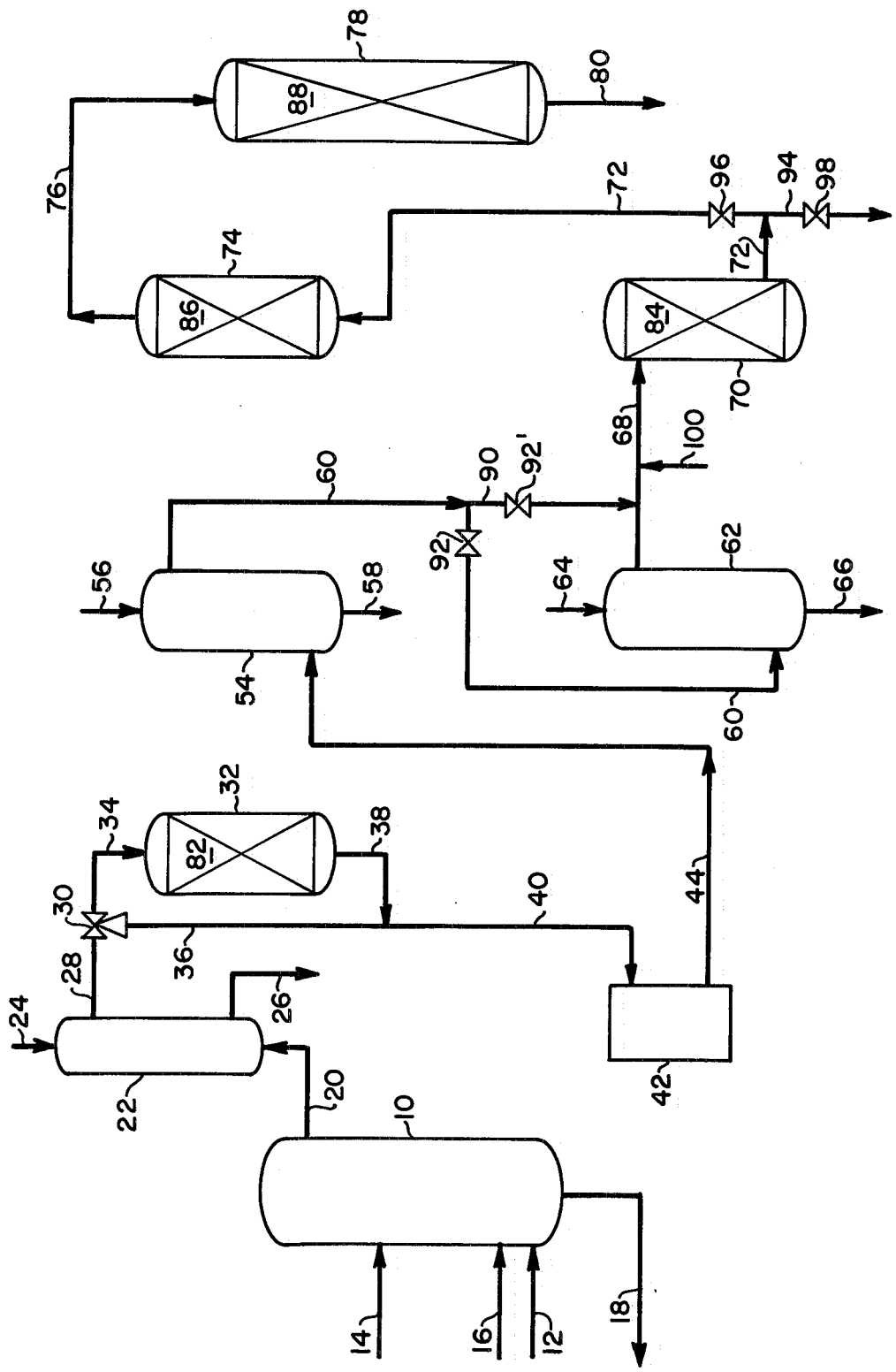

HYDRODESULFURIZATION PURIFICATION PROCESS FOR COAL GASIFICATION

BACKGROUND OF THE INVENTION

This application is a continuation-in-part of our earlier filed application, U.S. Ser. No. 808,425, abandoned, of the same title filed June 20, 1977, which is a continuation-in-part of U.S. Ser. No. 725,761, abandoned, of the same title filed Sept. 23, 1976 which is a continuation-in-part of U.S. Ser. No. 637,919, abandoned, of the same title filed Dec. 5, 1975.

FIELD OF THE INVENTION

This invention relates to an improved hydrodesulfurization process. More particularly, this invention relates to an improved process for removing organic sulfur from gas streams containing significant quantities of carbon monoxide, carbon dioxide, and hydrogen by converting said organic sulfur to hydrogen sulfide in the presence of nickel molybdenum and cobalt molybdenum and cobalt molybdenum catalysts.

PRIOR ART

Meeting current energy requirements has caused appreciable amounts of coal or other relatively abundant hydrocarbons to be converted into more commercially and environmentally acceptable energy forms, such as synthetic or substitute (SNG) natural gas. Many such processes are known. Examples can be found in British Pat. Nos. 561,679 and 563,350.

A typical coal gasification process to produce high-Btu gas having substantially the same composition as natural gas involves crushing the coal, sizing the coal, and introducing the coal into a gasification vessel where the coal is reacted with water and oxygen at high temperatures to produce a raw gas containing hydrogen, carbon monoxide, carbon dioxide, methane, nitrogen, and sulfur compounds. Naphtha and tars are condensed out and separated. Before the carbon monoxide and carbon dioxide can be methanated to produce SNG, the composition of the synthesis gas must be adjusted and the sulfur removed. The specific gasifier and conditions under which the gasifier is operated determine whether a shift converter will be necessary to adjust the $H_2/CO$ stoichiometric ratio. Thus it may be necessary to pass all or a portion of the produced gas across a shift converter or the shift converter may be eliminated entirely. A large portion of the excess carbon dioxide is then removed to provide the proper hydrogen-to-carbon oxide ratio for methane synthesis. During this process, most of the sulfur compounds are also removed. After $CO_2$ removal, if required, the hydrogen:carbon monoxide mol ratio on a water-free basis should be from about 2 to about 4 and preferably about 3 where the hydrogen:carbon monoxide ($H_2/CO$) ratio is defined as $$\frac{H_2}{CO} = \frac{H_2 - CO_2 + 3CH_4 + 3C_2H_2 + 4C_2H_4 + 5C_2H_6}{CO + CO_2 + CH_4 + 2C_2H_2 + 2C_2H_4 + 2C_2H_6} + \text{higher analogues}$$

In order to remove the remaining sulfur compounds, organic sulfur compounds are first converted to hydrogen sulfide in a catalytic sulfur hydrogenation reactor. The hydrogen sulfide is then adsorbed from the synthesis gas stream as it passes through a suitable sorbent such as iron oxide, zinc oxide or the like. Such sorbents will be discussed hereinafter by reference to zinc oxide although it should be understood that other suitable $H_2S$ sorbents can be used. The resulting purified synthesis gas then passes across a methanation catalyst, usually nickel, or a suitable carrier, where essentially all of the carbon monoxide and most of the carbon dioxide are converted to methane. The gas is then dried before use.

Other references such as British Pat. No. 567,273 and U.S. Pat. No. 1,916,824 relate to purifying gases such as town gas. These gases, however, have $H_2/CO$ ratios and hydrogen and carbon monoxide partial pressures sufficiently low that methanation in a catalytic sulfur hydrogenation reactor is not significant due to the low methanation potential of such gases. Modern gasification methods produce synthesis gases with hydrogen-to-carbon monoxide ratios and with hydrogen and carbon monoxide partial pressures sufficiently high to methanate over sulfur hydrogenation catalysts under organic sulfur hydrogenation conditions and produce high temperature methanation runaways dangerous to both equipment and personnel.

British Pat. No. 769,664 teaches that temperatures of up to 600° C. (1112° F.) can be reached with such materials; however, this reference does not consider the problems such temperatures produce. U.S. Pat. No. 3,922,148 teaches a process for producing a methane-rich gas stream without forming particulate carbon. The reference realizes the necessity for cleaning and scrubbing the gas stream prior to methanation.

Methanation in the sulfur hydrogenation reactor is not desirable since it results in excessively high temperatures and in the production of water which enhances the slippage of sulfur-bearing compounds through the zinc oxide scrubber.

Sulfur is a strong accumulative poison for methanation catalysts. To maintain a commercially feasible catalyst life and high activity, the sulfur content of the synthesis gas should be as low as possible, preferably less than 0.2 part per million (ppmv) prior to entering the methanation reactor. Most of the sulfur compounds in the synthesis gas after $CO_2$ removal will be present as hydrogen sulfide, carbonyl sulfide, and carbon disulfide, but many forms of organic sulfides, such as mercaptans and thiophenes, can be present.

Hot potassium carbonate solutions or diglycol amine solutions may be used to remove carbon dioxide and simultaneously absorb most of the hydrogen sulfide from the synthesis gas. Trace quantities of organic sulfur (i.e. typically from 1 to 100 ppmv sulfur dependent upon the coal feedstock, gasification conditions, etc.) remain in the synthesis gas and can be converted to hydrogen sulfide by passing the synthesis gas over sulfided cobalt molybdenum or nickel molybdenum catalysts. However, as previously stated, the feed gas to these catalysts has extremely high methanation potential and the hydrogenation of the sulfur is desirably carried out at process conditions which minimize methanation of the carbon oxides while effectively converting the organic sulfur compounds to $H_2S$. Materials normally used in the fabrication of such process equipment cannot safely operate at the high temperatures (greater than 1500° F.) which result from such methanation. Materials which operate safely at such temperatures are expensive. Thus, the effectiveness and safety of the process require the operation of such reactors at conditions which do not result in the methanation of carbon oxides yet still effect the conversion of sulfur compounds to a form (hydrogen sulfide) easily removed prior to methanation.

It is therefore desirable that a sulfur hydrogenation system be developed which would allow conversion of sulfur compounds such as carbonyl sulfide, carbon disulfide, mercaptans, thiophenes and the like to hydrogen sulfide.

SUMMARY OF THE INVENTION

It has now been discovered that the hydrogenation of sulfur compounds in mixture with gaseous mixtures of carbon oxides and hydrogen to form hydrogen sulfide can be safely carried out using nickel molybdenum and cobalt molybdenum catalysts at an inlet temperature of about 425° to about 700° F., a space velocity of about 1500 to about 5000 standard cubic feet per hour (SCFH) of gas per cubic foot of catalyst ($hr^{-1}$), wherein the gaseous mixture contains from about 25 to about 100 parts per million volume (ppmv) hydrogen sulfide and from about 0.1 to about 15 weight percent water. The process can be carried out at temperatures greater than 700° F. provided that space velocities greater than 5000 $hr^{-1}$ are used or concentrations of hydrogen sulfide greater than 100 ppmv $H_2S$ are present in the gaseous mixture.

BRIEF DESCRIPTION OF THE DRAWING

The FIGURE is a schematic flowsheet of a methanation process.

In the description of the present invention, the terms "synthesis gas" and "inlet gas" refer to the feed gas to the catalytic sulfur hydrogenation reactor. The terms "product gas" or "outlet gas" refer to the product stream from the catalytic sulfur hydrogenation reactor. The term "sulfur compounds" as used herein refers to carbonyl sulfide, carbon disulfide, mercaptans, thiophenes and the like.

In the FIGURE, a gasifier 10 is shown equipped with a steam inlet 12, a carbonaceous fuel inlet 14, an oxygen supply 16, an ash removal 18 and a gaseous mixture outlet 20. The gaseous mixture so produced flows through outlet 20 to a water spray vessel 22 where it flows through vessel 22 countercurrently to a water stream injected through spray inlet 24 and recovered through a water outlet 26. The scrubbed gaseous mixture is recovered through a line 28 and passed to a splitter valve 30 where a portion is directed to a line 34 which is an inlet to a shift reactor 32 which contains a catalyst bed 82. The shifted gaseous mixture is recovered through an outlet 38 and passed to a line 36 where it is mixed with the other portion of the scrubbed gaseous mixture from splitter valve 30. The combined mixtures are passed through a line 40 to a condenser 42 where a major portion of the water is removed from the mixture. The dried mixture then passes from condenser 42 through a line 44 to an oil shower vessel 54 where it is contacted with an oil shower. Vessel 54 includes an oil inlet 56 and an oil recovery line 58. Oil flows countercurrently to the gaseous stream as it passes through vessel 54 and into an outlet 60 through which it passes to an aqueous alkaline scrubber vessel 62. Vessel 62 includes an alkaline solution inlet 64 and an alkaline solution outlet 66. The scrubbed synthesis gas mixture passes from vessel 62 via a line 68 to a catalytic vessel 70 where any remaining sulfur compounds are converted to hydrogen sulfide over a catalyst 84 positioned in vessel 70. The gaseous mixture is recovered from vessel 70 via a line 72 and passed to a zinc oxide scrubber 74 which contains a bed of zinc oxide 86. The purified mixture from vessel 74 is passed via a line 76 to a methanation reactor 78 containing a catalyst bed 88 of methanation catalyst over which the synthesis gas reacts to produce methane which is recovered through line 80.

In accordance with the present invention, the composition of the gaseous mixture passing to catalytic vessel 70 is adjusted to contain from about 25 to about 100 ppmv hydrogen sulfide. Other sulfur components may also be present in this gas and typically are present in an amount up to about 200 ppmv although in some instances higher sulfur contents will be present. Such other sulfur compounds are carbonyl sulfide, carbon disulfide, mercaptans, thiophenes and the like, which are desirably hydrogenated to hydrogen sulfide in catalytic vessel 70. It has been found desirable that from about 25 to about 100 ppmv hydrogen sulfide be present in this stream. The $H_2S$ content of the stream flowing to catalytic vessel 70 through line 68 may be adjusted by adding hydrogen sulfide, through a line 100 or through line 90 by operation of valves 92 and 92'. The gas added via line 90 will, of course, contain sulfur compounds other than $H_2S$ but such are not considered detrimental since many such sulfur compounds are not removed in vessel 62 and are present in line 68 after treatment in vessel 68. Typically, vessel 62 has been operated to control the carbon dioxide level in the steam passing to catalytic vessel 70. Such permits a wide variation in the $H_2S$ content of the stream flowing to catalytic vessel 70 with undesirable results as set forth more precisely hereinafter. In particular, the use of high volumes of hydrogen sulfide results in an unacceptable load on the sulfur-absorbing processes downstream from vessel 70 since additional quantities of hydrogen sulfide are generated in vessel 70. While it is true that higher temperatures can be used if additional quantities of hydrogen sulfide are used, it is undesirable that quantities in excess of 100 ppmv be present in the stream flowing to catalytic vessel 70 since the overall objective of the process is to remove the sulfur from the gaseous mixture flowing to vessel 78. The use of less than about 25 ppmv $H_2S$ results in a tendency to form methane from the carbon oxides and hydrogen present in the gaseous mixture, and in a tendency to strip the sulfur from the sulfided catalysts normally used in catalytic vessel 70.

Desirably, small amounts of water are also present in the gaseous mixture, typically from 0.1 to about 15 weight percent. If more than about 15 weight percent water is present, undesirable hydrogen sulfide slippage occurs in subsequent processing vessels such as the zinc oxide vessel commonly used. Offsetting this disadvantage is the desirability of having water in catalytic vessel 70 to facilitate the conversion of sulfur compounds to hydrogen sulfide. Preferably the water is present in an amount from about 1.0 to about 5.0 volume percent.

The inlet gas as noted above, contains carbon oxides and hydrogen and, typically, the carbon monoxide is present in an amount equal to at least about 10 mol percent of the inlet gas. The $H_2/CO$ ratio is normally between 2 and 4, and preferably about 3. This gaseous mixture is, of course, readily converted to methane over sulfur hydrogenation catalysts such as those used in vessel 70, as would be expected since this gas is the feedstream prepared for methanation in methanator 78.

The gaseous mixture adjusted to the composition described above is desirably charged to catalytic vessel 70 at a temperature from about 425° to about 700° F.

and at a space velocity of about 1500 to about 5000 hr$^{-1}$. Desirably, the temperature is greater than about 425° F. since, at temperatures below 425°, poisonous nickel carbonyl begins to be formed with the attendant stripping of the nickel compounds from the catalyst. Such is clearly undesirable and it is considered critical that the temperature be in excess of 425° F. in all instances. At temperatures above about 700° F., quantities of hydrogen sulfide greater than 100 ppmv are required to inhibit the initiation of methanation reactions and prevent the stripping of the sulfur from the sulfided catalyst. Therefore, it is preferred that the temperature be from about 550° to about 700° F. The space velocity is desirably in excess of about 1500 hr$^{-1}$ to prevent methanation and it is desirably below about 5000 hr$^{-1}$ in order to achieve substantially complete hydrogenation of all sulfur compounds contained in the inlet gas. While lower space velocities, for instance as low as 750 hr$^{-1}$ can be used, it has been found that hydrogen sulfide concentrations in excess of about 250 ppmv are required to prevent methanation at such lower space velocities.

The cobalt and nickel/molybdenum catalysts used typically contain at least one metal component selected from the group consisting of nickel and nickel compounds and cobalt and cobalt compounds and at least one second-metal component selected from the group consisting of molybdenum and molybdenum compounds supported on a suitable catalyst carrier such as alumina, silica, silica-alumina, kieselguhr and the like. Two such catalysts are described more precisely in the following examples. The particular catalyst used is not considered to constitute a part of the present invention since such catalysts are well known to those skilled in the art and it is believed that such catalysts need not be described further.

While the space velocities and temperatures set forth herein may have been used earlier in similar reactions etc., it is pointed out that the particular combination of space velocity, temperature and hydrogen sulfide content in the inlet gas has been found necessary to accomplish hydrogenation of the organic sulfur compounds without forming methane from the carbon monoxide and hydrogen present and without desulfurizing the catalyst. The particular combination set forth is considered necessary for the successful practice of the present invention. The reaction conditions such as reactor inlet temperature, pressure, space velocity, type catalyst, and hydrogen sulfide concentration must be carefully balanced to provide safe and effective hydrogenation of the sulfur compounds in the synthesis gas stream without inducing excessive methanation.

While the process of the present invention is useful in adiabatic systems, isothermal systems are preferred where some heat is removed from the hydrogenation reactor in order to lower methanation potential. Heat removal is, of course, unnecessary unless some methanation is taking place.

Suitable operating pressures are from about 1 to about 140 atmospheres absolute, with the range from 20 to 30 atmospheres being preferred.

Of the nickel molybdenum and cobalt molybdenum catalysts set forth above, nickel molybdenum catalysts are preferred, since the critical range in which adequate organic sulfur conversion is obtained while preventing unwanted methanation is larger than for cobalt molybdenum catalysts.

EXAMPLES

A test was carried out under adiabatic conditions using a nickel molybdenum catalyst and coal gas as the inlet gas. The general reaction conditions are fully set forth in the *Canadian Journal of Chemical Engineering*, Vol. 49, pp 605-610, 1971. The article is entitled "Removal of Organic Sulfur from Coal Gas". This article, which is hereby incorporated by reference, fully teaches the reaction kinetics and equilibrium reactions of the sulfur hydrogenation process. Using prior art conditions, it was found that temperatures during the experiments set forth herein exceeded 1392° F., far too high for the conventional steel reactors normally used.

In both examples below, all parts and percentages are by weight unless otherwise specified.

The reactors used for the tests were insulated and had electric heaters to minimize heat loss. The reactor used in Test A contained a catalyst bed 0.9 inch in diameter and 72 inches long. In Test B, two reactors were connected together in series so that the catalyst bed was 0.9 inch in diameter and 144 inches long. The reactor loading conditions for both tests are given in Table I.

Table I

| | REACTOR LOADING | | | |
|---|---|---|---|---|
| Test | Catalyst | Wt/gms | RCD* | PBD** |
| A | I | 596.7 | 49.62 | 48.36 |
| A | II | 649.9 | 54.05 | 54.65 |
| B | I | 1200.7 | 49.92 | 48.36 |
| B | II | 1307.7 | 54.38 | 54.65 |

*RCD = Reactor catalyst density - lb/cu.ft. (determined from reactor loading)
**PBD = Packed bulk density - lb/cu.ft. (determined in a 1000 ml, 2.5" I.D. graduated cylinder)

CATALYST I

NIMOX No. 371 (trademark of Laporte Industries, Ltd., General Chemical Division, Widnes, Lansc, England, Telephone No. 051-424-5555, Telex 627316) which has the specifications set forth below:

| Typical Properties of NIMOX 371 2.5 mm & 1.5 mm EXTRUDATES | | |
|---|---|---|
| Particle Size | | |
| Mean diameter, mm. | 2.5 | 1.5 |
| Mean length, mm. | 4.32 | 3.15 |
| % wt. passing 18 mesh BSS | 0.1 | 0.2 |
| Loss on calcination at 550° C. | 2.0 | 2.0 |
| Physical Properties, material calcined for 2 hours at 550° C. | | |
| Maximized bulk density, g/ml | 0.75 | 0.75 |
| Reactor packing density, kg/m$^3$ | 690 | 690 |
| Piece crushing strength, kg/mm | 2.05 | 1.35 |
| Attrition loss, % wt. | 4.0 | 2.5 |
| Chemical Analysis - on basis of material heated to 550° C. | | |
| Nickel content as NiO | % wt. | 3.7 |
| Molybdenum content as MoO$_3$ | % wt. | 10.2 |
| Na$_2$O + K$_2$O | % wt. | 0.06 |
| Silica content as SiO$_2$ | % wt. | 0.4 |
| Sulfate content as SO$_3$ | % wt. | 3.0 |
| Iron content as Fe | % wt. | 0.05 |
| Surface Area M$^2$/g | | 272 |
| Total pore volume ml/g | | 0.45 |

CATALYST II

COMOX No. 204 (trademark of Laporte Industries, Ltd., General Chemical Division, Widnes, Lancs, England, Telephone No. 051-424-5555, Telex 627136) which has the specifications set forth below:

| Specifications for COMOX 204 Desulfurization Catalyst | | |
|---|---|---|
| Loss on calcination at 550° C. | % wt. | 4.0 maximum |
| Chemical Analysis on basis of Nil LOC at 550° C. | | |
| CoO | % wt. | 2.5 minimum |

Table I-continued

| | | |
|---|---|---|
| MoO$_3$ | % wt. | 14.0 minimum |
| Na$_2$O + K$_2$O | % wt. | 0.15 maximum |
| SiO$_2$ | % wt. | 2.0 maximum |
| Primary base | | Alumina |

Physical Properties of material
freshly calcined for 2 hours at 550° C.

| | | |
|---|---|---|
| Defective tablets | % wt. | 2.0 maximum |
| Dust (thru 18 BSS seive) | % wt. | 0.5 maximum |
| Tablet length, mm | 99% within | 2.92% 0.26 |
| Tablet diameter, mm | 99% within | 2.92% 0.26 |
| Mean individual crushing strength, kg | | 5.0 minimum |
| Attrition loss | % wt. | 3.0 maximum |
| Bulk Density | g/ml | 0.83% 0.03 |

Test A

The catalysts used were NIMOX No. 371 and COMOX No. 204 which are considered representative of useful cobalt and nickel molybdenum catalysts. Both catalysts were presulfided in a hydrogen-rich stream containing between 2000 and 5000 ppmv of hydrogen sulfide at a space velocity of 750 hr$^{-1}$. The initial temperature was 500° F.; however, the temperature was slowly increased during sulfiding to a final temperature of 700° F. The sulfiding process took approximately 10 hours, and the catalysts were designated as completely sulfided when the inlet and outlet hydrogen sulfide concentrations equilibrated. After sulfiding, the catalysts contained approximately 3.85 (NIMOX) and 4.34 (COMOX) weight percent total sulfur. Prior to sulfiding, the catalysts contained 1.4 (NIMOX) and 0.34 (COMOX) weight percent total sulfur.

The inlet gas was dry sulfur-free gas containing 66 percent hydrogen, 12 percent methane, 15 percent carbon monoxide, 5 percent carbon dioxide and 2 percent nitrogen (composition is given as mol percent).

Table II shows the maximum bed temperature and location (inches from the reactor inlet), the product gas methane concentration, and the product gas hydrogen sulfide concentration as a function of time for both catalysts.

The reactor containing the NIMOX catalyst was on-stream 23.7 hours during which time the inlet temperature and space velocity were held constant at their initial 700° F. and 750 hr$^{-1}$ values, respectively.

The reactor containing the COMOX catalyst had the same initial temperature and space velocity; however, after 12 hours on-stream, the space velocity was increased to 1500 hr$^{-1}$. This space velocity increase resulted in a decline in the maximum reactor temperature, and in the methane and hydrogen sulfide concentration in the outlet gas. These values continued to decrease until after 24 hours on-stream the space velocity was returned to the initial 750 hr$^{-1}$ value upon which the methanation rate increased significantly.

As shown in Table II, methanation began immediately with each catalyst when the inlet gas was introduced at 700° F. and 750 hr$^{-1}$.

TABLE II

Maximum Reactor Temperatures; Product Methane and Hydrogen Sulfide Concentrations Test A

| CUMULATIVE HRS. ON-STREAM | | MAXIMUM TEMP. - °F. | | INCHES FROM TOP OF CATALYST BED | | PRODUCT MOLE PERCENT - CH$_4$ | | PRODUCT PPMV - H$_2$S | |
|---|---|---|---|---|---|---|---|---|---|
| I | II | I | II | I | II | I | II | I | II |
| 0.5 | 0.6 | 746 | 845 | 38 | 20 | 15.50 | 21.53 | 218.7 | 482.9 |
| 1.0 | 1.4 | 763 | 902 | 38 | 24 | 16.12 | 22.48 | 126.9 | 470.8 |
| 2.0 | 2.7 | 791 | 974 | 72 | 24 | 16.60 | 25.09 | 114.0 | 499.4 |
| 3.0 | 3.6 | 836 | 1,029 | 72 | 24 | 17.53 | 24.90 | 126.9 | 532.0 |
| 4.0 | 4.6 | 868 | 1,121 | 72 | 30 | 17.40 | 25.95 | 131.2 | 598.6 |
| 5.1 | 5.7 | 899 | 1,174 | 70 | 32 | 18.12 | 26.63 | 154.5 | 595.0 |
| 5.9 | 6.8 | 923 | 1,215 | 66 | 32 | 19.32 | 27.20 | 181.8 | 885.3 |
| 7.3 | 7.7 | 983 | 1,197 | 62 | 32 | 20.00 | 26.33 | 298.0 | 919.5 |
| 8.7 | 9.2 | 1,019 | 1,240 | 60 | 46 | 19.72 | 26.85 | 375.0 | 1,247 |
| 10.0 | 10.3 | 1,050 | 1,288 | 60 | 50 | 19.78 | 26.99 | 434.0 | 1,163 |
| 10.9 | 11.3 | 1,072 | 1,313 | 60 | 44 | 19.88 | 26.25 | 487.5 | 1,273 |
| 12.0 | 12.7 | 1,115 | 1,380 | 52 | 50 | 19.78 | 21.70 | 531.0 | 2,043 |
| 13.0 | 13.8 | 1,131 | 1,370 | 58 | 70 | 22.12 | 19.70 | 620.6 | 1,871 |
| 14.0 | 15.2 | 1,158 | 1,340 | 62 | 70 | 21.04 | 18.55 | 740 | 1,376 |
| 15.0 | 16.9 | 1,200 | 1,278 | 66 | 72 | 20.84 | 17.23 | 888 | 623.7 |
| 16.5 | 18.7 | 1,256 | 1,209 | 72 | 72 | 20.97 | 15.72 | 1,022 | 190.0 |
| 17.6 | 19.8 | 1,293 | 1,151 | 70 | 72 | 20.96 | 15.04 | 1,119 | 150.5 |
| 18.6 | 20.8 | 1,308 | 1,083 | 72 | 72 | 20.97 | 14.82 | 1,269 | 26.3 |
| 20.0 | 22.0 | 1,316 | 978 | 72 | 72 | 20.85 | 14.88 | 1,118 | 20 |
| 21.1 | 23.5 | 1,317 | 973 | 72 | 72 | 20.10 | 14.60 | 989 | 11 |
| 21.1 | 23.5 | 1,317 | 973 | 72 | 72 | 20.10 | 14.60 | 989 | 11 |
| 22.4 | 24.2 | 1,311 | 965 | 72 | 72 | 19.75 | 18.47 | 826 | 12 |
| 23.7 | 26.4 | 1,291 | 1,095 | 72 | 72 | 19.15 | 18.99 | 742 | 14 |
| | 30.1 | | 1,230 | | 24 | | 20.15 | | 17.6 |
| | 34.1 | | 1,253 | | 38 | | 21.07 | | 600 |
| | 37.0 | | 1,490 | | 44 | | 20.82 | | 673.9 |

Adiabatic- Equilibrium
Product Gas
I - NIMOX #371
II - COMOX #204

Table III gives the total weight percent sulfur on 6-inch segments of each catalyst at the conclusion of the experiments shown in Test A.

TABLE III

WEIGHT PERCENT TOTAL SULFUR ON CATALYST

| Location with Respect to Initial Top of Catalyst Bed | NIMOX #371 Wt. % Sulfur | COMOX #204 Wt. % Sulfur |
|---|---|---|
| 0-6" | 2.61 | 4.92 |
| 6-12 | 2.65 | 5.15 |
| 12-18 | 2.70 | 4.66 |
| 18-24 | 2.65 | 4.32 |

TABLE III-continued

| WEIGHT PERCENT TOTAL SULFUR ON CATALYST | | |
|---|---|---|
| Location with Respect to Initial Top of Catalyst Bed | NIMOX #371 Wt. % Sulfur | COMOX #204 Wt. % Sulfur |
| 24–30 | 2.67 | 3.99 |
| 30–36 | 2.50 | 3.85 |
| 36–42 | 2.41 | 3.66 |
| 42–48 | 2.40 | 3.33 |
| 48–54 | 2.27 | 3.11 |
| 54–60 | 2.23 | 3.03 |
| 60–66 | 2.53 | 2.92 |
| 66–72 | 3.97 | 2.79 |
| Fresh | 1.40 | 0.34 |
| Start | 3.85 | 4.34 |

Clearly, the sulfided catalyst has been partially desulfided at the test conditions.

TEST B

The catalysts used were the same as in Test A. The catalysts were sulfided at 700° F. with gas streams containing various amounts of carbon oxides and hydrogen as well as 2000–5000 ppmv of hydrogen sulfide. The NIMOX No. 371 catalyst was sulfided at space velocities varying from 150 hr$^{-1}$ to 750 hr$^{-1}$ while the COMOX No. 204 catalyst was sulfided at a space velocity of 1500 hr$^{-1}$. No methanation, high temperatures, or elemental sulfur formation was observed during these sulfiding procedures.

After sulfiding, the NIMOX No. 371 catalyst was contacted at 700° F. and a space velocity of 750 hr$^{-1}$ with a gas stream containing 66 percent hydrogen, 12 percent methane, 15 percent carbon monoxide, 5 percent carbon dioxide, 2 percent nitrogen, and 50 ppmv hydrogen sulfide. Methanation was observed at these conditions, and the space velocity was increased to 1500 hr$^{-1}$. At this higher space velocity, no methanation was observed, and the feed gas stream was doped with various concentrations of carbonyl sulfide (0–15 ppmv) and carbon disulfide (0–8 ppmv). The test lasted 10 hours, and Table IV shows that the NIMOX No. 371 catalyst converted essentially all the incoming organic sulfur to H$_2$S.

TABLE IV

| SULFUR ANALYSES FOR TEST B | | | | | | |
|---|---|---|---|---|---|---|
| COMOX #204 Sulfur Concentrations, ppmv | | | | | | |
| | INLET | | | OUTLET | | |
| Time | H$_2$S | COS | CS$_2$ | H$_2$S | COS | CS$_2$ |
| 1552 | 50.97 | 3.99 | Nil | 52.12 | Nil | Nil |
| 1851 | 52.43 | 9.46 | Nil | 52.74 | Nil | Nil |
| 2339 | 57.98 | 13.38 | Nil | 62.01 | Nil | Nil |
| 0040 | 56.45 | 13.21 | 0.31 | 63.99 | Nil | Nil |
| 0350 | 54.99 | 12.12 | 2.09 | 56.65 | Nil | Nil |
| 0430 | 54.55 | 11.40 | 2.09 | 59.40 | Nil | 0.15 |
| 0725 | 55.44 | 11.27 | 11.22 | 60.73 | Nil | Nil |
| 0200 | 55.10 | 13.27 | 8.27 | 69.17 | Nil | Nil |
| 0600 | 57.92 | 15.10 | 8.49 | 61.53 | Nil | Nil |
| 1230 | 50.63 | 12.19 | 7.41 | 55.26 | 0.12 | Nil |
| 1530 | 54.13 | 12.54 | 7.43 | 61.69 | Nil | Nil |
| NIMOX #371 Sulfur Concentrations, ppmv | | | | | | |
| | INLET | | | OUTLET | | |
| Time | H$_2$S | COS | CS$_2$ | H$_2$S | COS | CS$_2$ |
| 0540 | 58.63 | 12.71 | Nil | 81.33 | Nil | Nil |
| 0920 | 65.49 | 13.65 | Nil | 61.96 | Nil | Nil |
| 1310 | 57.38 | 17.92 | 7.06 | 55.95 | Nil | Nil |
| 1400 | 57.46 | 15.33 | 7.18 | 55.25 | Nil | Nil |

The COMOX No. 204 catalyst was tested with the same gas stream at 700° F. and a 1500 hr$^{-1}$ space velocity. High temperatures resulting from methanation occurred even at this higher space velocity, and the inlet reactor temperature was lowered to 500° F. At these new conditions, completely methanation-free operation of the COMOX catalyst was achieved. The feed gas stream was then supplemented with (0–15 ppmv) carbonyl sulfide and (0–12 ppmv) carbon disulfide. The test lasted 50 hours. Inlet and outlet organic sulfur concentrations are given in Table IV. Product gas organic sulfur concentrations were almost always less than 0.1 ppmv, and frequently they were nil.

It appears that nickel molybdenum catalysts have a lower methanation potential than cobalt molybdenum catalysts under the conditions of the present invention which makes nickel molybdenum the preferred sulfur hydrogenation catalyst.

Summarizing the present invention, a sulfur hydrogenation reactor can be operated effectively and methanation-free on synthesis gas when utilizing from 425° to 700° F. inlet temperatures and a space velocity greater than 1500 hr$^{-1}$ while still converting essentially all incoming COS and CS$_2$ to H$_2$S.

While certain embodiments and details have been shown for the purpose of illustrating this invention, it will be apparent to those skilled in the art that various changes and modifications may be made herein without departing from the spirit or the scope of the invention.

Having thus described the invention, we claim:

1. In a method for removing organic sulfur compounds selected from the group consisting of carbonyl sulfide, carbon disulfide, mercaptans and thiophenes from a gaseous mixture comprising hydrogen, carbon monoxide and said organic sulfur compounds, said carbon monoxide being present in an amount equal to at least 10 mol percent of said mixture and said hydrogen being present in an amount such that the ratio H$_2$/CO is from about 2.0 to about 4.0, to produce a gaseous mixture containing less than 0.2 ppmv sulfur by converting said organic sulfur compounds into hydrogen sulfide in the presence of a sulfided catalyst consisting essentially of at least one metal component selected from the group consisting of nickel and nickel compounds and cobalt and cobalt compounds and at least one second metal component selected from the group consisting of molybdenum and molybdenum compounds supported on a suitable catalyst carrier and subsequently removing at least a major portion of the hydrogen sulfide from said gaseous mixture, the improvement comprising adjusting the composition of said gaseous mixture to a hydrogen sulfide content from about 25 to about 100 ppmv and a water content from about 0.1 to about 15 weight percent to produce an adjusted gaseous mixture and contacting said adjusted gaseous mixture with said catalyst at a space velocity from about 1500 to about 5000 hr$^{-1}$ and a temperature from about 425° to about 700° F. without inducing excessive methanation and without desulfurizing the catalyst.

2. The improvement of claim 1 wherein said contacting is at a pressure from about 1 to about 140 atmospheres.

3. The improvement of claim 2 wherein said pressure is from 20 to 30 atmospheres.

4. The improvement of claim 1 wherein said contacting is at substantially adiabatic conditions.

5. The improvement of claim 1 wherein said contacting is carried out under essentially isothermal conditions.

6. In a method for producing a synthesis gas mixture containing less than 0.2 ppmv sulfur, said mixture comprising at least 10 mole percent carbon monoxide and from about 20 to about 40 mole percent hydrogen so that the ratio, $H_2/CO$, is from about 2.0 to about 4.0, said method consisting essentially of:
  (a) producing a raw gas containing hydrogen, carbon monoxide, carbon dioxide, methane, nitrogen and sulfur compounds by reacting coal with water and oxygen at high temperatures;
  (b) adjusting the $H_2/CO$ ratio of said raw gas to a value from about 2.0 to about 4.0 to produce said synthesis gas mixture;
  (c) contacting said synthesis gas mixture with an aqueous alkaline solution to remove at least a major portion of the carbon dioxide and acidic sulfur compounds present in said synthesis gas mixture;
  (d) contacting said synthesis gas mixture with a sulfided catalyst consisting essentially of at least one metal component selected from the group consisting of nickel and nickel compounds, and cobalt and cobalt compounds, and at least one second metal compound selected from the group consisting of molybdenum and molybdenum compounds supported on a suitable catalyst carrier to convert sulfur compounds remaining in said synthesis gas mixture to hydrogen sulfide; and, thereafter
  (e) removing said hydrogen sulfide to produce said synthesis gas mixture containing less than 0.2 ppmv sulfur;

the improvement comprising: adjusting the composition of the synthesis gas mixture charged to said catalyst to a hydrogen sulfide content from about 25 to about 100 ppmv and a water content from about 0.1 to about 15 weight percent and contacting said catalyst with said synthesis gas mixture at a space velocity from about 1500 to about 5000 $hr^{-1}$ and a temperature from about 425° to about 700° F. without inducing excessive methanation and without desulfurizing the catalyst.

* * * * *

UNITED STATES PATENT OFFICE
CERTIFICATE OF CORRECTION

PATENT NO. : 4,175,928

DATED : November 27, 1979

INVENTOR(S) : Michael W. Britton, Eugene A. Harlacher, John N. Dew, Joseph A. Kleinpeter It is certified that error appears in the above-identified patent and that said Letters Patent are hereby corrected as shown below:

Col. 1, line 22: delete "and cobalt molybdenum"

Signed and Sealed this

Fourth Day of March 1980

[SEAL]

Attest:

SIDNEY A. DIAMOND

Attesting Officer — Commissioner of Patents and Trademarks